(12) United States Patent
Strobbia et al.

(10) Patent No.: US 8,509,027 B2
(45) Date of Patent: Aug. 13, 2013

(54) CONTINUOUS ADAPTIVE SURFACE WAVE ANALYSIS FOR THREE-DIMENSIONAL SEISMIC DATA

(75) Inventors: Claudio Luciano Strobbia, Pavia (IT); Anna Glushchenko, Moscow (RU)

(73) Assignee: WesternGeco L.L.C., Houston, TX (US)

(*) Notice: Subject to any disclaimer, the term of this patent is extended or adjusted under 35 U.S.C. 154(b) by 344 days.

(21) Appl. No.: 12/620,941

(22) Filed: Nov. 18, 2009

(65) Prior Publication Data
US 2010/0128563 A1   May 27, 2010

Related U.S. Application Data

(60) Provisional application No. 61/118,317, filed on Nov. 26, 2008.

(51) Int. Cl.
G01V 1/28 (2006.01)
G01V 1/30 (2006.01)

(52) U.S. Cl.
USPC .................. 367/54; 367/49; 367/38

(58) Field of Classification Search
USPC ................ 367/38, 47, 54, 49; 702/17
See application file for complete search history.

(56) References Cited

U.S. PATENT DOCUMENTS

| | | | |
|---|---|---|---|
| 5,781,503 A | 7/1998 | Kim | |
| 6,665,617 B2 | 12/2003 | Shobayashi | |
| 7,218,573 B1 | 5/2007 | Laake | |
| 7,330,799 B2 | 2/2008 | Lefebvre et al. | |
| 7,408,836 B2 | 8/2008 | Muyzert et al. | |
| 2009/0122645 A1* | 5/2009 | Guigne et al. | 367/56 |
| 2011/0120724 A1* | 5/2011 | Krohn | 166/369 |

FOREIGN PATENT DOCUMENTS

CN    1387051    12/2002

OTHER PUBLICATIONS

Barmin et al., "Pure and Applied Geophysics", vol. 158 (2001), pp. 1351-1375.*
Bensen et al., "Geophysics. J. Int.", vol. 169 (2007), pp. 1239-1260.*
PCT Search Report, dated Jul. 1, 2010, Application No. PCT/US2009/065347.
McMechan, G. A., Yedlin, M. J., Analysis of Dispersive Wave by Wave Field Transformation, Geophysics, 1981, 46, pp. 869-874.
Schmidt, R. O., Multiple Emitter Location and Signal Parameter Estimation, IEE Trans Antennas Propagation, 1986 v AP-34, pp. 276-280.
Xia, J., Miller R. D., Park, C. B., Estimation of Near-Surface Shear Wave Velocity by Inversion of Rayleigh Waves, Geophysics, 1999 64, pp. 691-700.
Aki and Richards, Quantitative Seismology, Second Edition, University Science Books: Sausalito, 2002:.pp. 1-720.

(Continued)

Primary Examiner — Ian Lobo (57) ABSTRACT

A technique includes receiving seismic data acquired in a survey of a region, the region being associated with locations; processing the seismic data to estimate at least one frequency dependent surface wave property over the region; based at least in part on the estimated frequency dependent surface wave property(ies), determining a frequency dependent data processing geometry for each location; and processing the seismic data based at least in part on the determined data processing geometries to derive a spatially continuous representation of a surface wave property across the region.

13 Claims, 7 Drawing Sheets

OTHER PUBLICATIONS

Bohlen, T., Kugler, S., Klein, G., Theilen, F., 1.5-D Inversion of Lateral Variation of Scholte Wave Dispersion, Geophysics, 2004, 69, pp. 330-344.

Hayashi, K., Suzuki, H., CMP Cross-Correlation Analysis of Multi-Channel Surface-Wave Data, Exploration Geophysics, 2004, 35, pp. 7-13.

Socco, L.V., Strobbia, C., Surface-Wave Method for Near-Surface Characterization: A Tutorial, Near Surface Geophysics, 2004, 165-185.

Shapiro, N. M., Campillo, M., Stehly, L., Ritzwoller, M. H., High Resolution Surface-Wave Tomography from Ambient Seismic Noise, Science 2005, 307 (5715), pp. 1615-1618.

Grandjean, G., Bitri, A. 2M-SASW: Multifold Multichannel Seismic Inversion of Local Dispersion of Rayleigh Waves in Laterally Heterogeneous Subsurfaces: Application to the Super-Sauze Earthflow, France: Near Surface Geophysics, 2006, 4, pp. 367-375.

Strobbia, C., Foti, S., Multi-Offset Phase Analysis of Surface Wave Data (MOPA), Journal of Applied Geophysics, 2006, v 59/4, pp. 300-313.

Ross, W. S., Lee, S., Daillo, M. S., Johnson, M. L., Shatilo, A. P., Anderson, J. E., Martinez A., Characterization of Spatially Varying Surface Waves in a Land Seismic Survey, SEG Expanded Abstract, 2008.

Office Action and Search Report of Chinese Application No. 200980147176.7 dated Sep. 20, 2012: pp. 1-11.

* cited by examiner

CONTINUOUS ADAPTIVE SURFACE WAVE ANALYSIS FOR THREE-DIMENSIONAL SEISMIC DATA

This application claims the benefit under 35 U.S.C. §119 (e) to U.S. Provisional Application Ser. No. 61/118,317, entitled, "CONTINUOUS SURFACE WAVE ANALYSIS IN 3D DATA," which was filed on Nov. 26, 2008, and is hereby incorporated by reference in its entirety.

BACKGROUND

The invention generally relates to continuous surface wave analysis for three-dimensional seismic data.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation reflect, refract or scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

For a land-based seismic survey, the seismic waves include surface waves and body waves. The surface waves propagate without radiation into the Earth's interior, are parallel to the Earth's surface and have a reduced geometric spreading as compared to the body waves. The surface waves carry a significant part of the energy that is radiated by a seismic source at the Earth's surface.

Surface waves constitute most of the coherent noise in seismic data. In this manner, the surface waves are source-generated events that are characterized by relatively low velocity and relatively high amplitudes, and the surface waves superimpose onto the useful signal. This coherent noise (often called ground roll in land seismic applications) may be in the form of many different wave types, such as Rayleigh waves with multiple modes of propagation, Lamb waves, P-guided waves, Love waves and Scholte waves.

The propagation properties of surface waves depend on the elastic properties of the "near-surface," the shallow portion of the Earth, which is responsible for most of the perturbation and degradation of the acquired seismic data. For purposes of designing filters to attenuate surface wave noise, it is generally important to accurately identify the properties of the surface waves. Additionally, knowledge of the surface wave properties may be beneficial for other purposes, such as determining the local elastic properties of the near surface and estimating static corrections.

SUMMARY

In an embodiment of the invention, a technique includes receiving seismic data acquired in a survey of a region, the region being associated with locations; processing the seismic data to estimate at least one frequency dependent surface wave property over the region; based at least in part on the estimated frequency dependent surface wave property(ies), determining a frequency dependent data processing geometry for each location; and processing the seismic data based at least in part on the determined data processing geometries to derive a spatially continuous representation of a surface wave property across the region.

Advantages and other features of the invention will become apparent from the following drawing, description and claims.

DETAILED DESCRIPTION

Techniques are described herein to construct a spatially continuous three-dimensional (3-D) representation of surface wave properties (such as velocity or attenuation, as examples) using seismic data acquired from an arbitrary seismic acquisition geometry. Surface wave properties that are determined using the techniques that are disclosed herein may be used in a number of different applications, such as near surface modeling, static correction estimation, perturbation correction, noise filter design, shallow drilling hazard mapping, etc.

As described below, the surface wave properties are first independently determined at given locations of the surveyed region (at the receiver locations, for example) to produce corresponding spatially continuous pseudo sections of the surface wave property. The pseudo sections are then merged to produce the 3-D representation of the surface wave property across the surveyed region. As described herein, for purposes of determining the surface wave properties at each location, a frequency-dependent data processing geometry is first determined for the location based on an adaptive process that considers frequency-dependent surface wave property estimates. The data processing geometries govern the selection of traces that are processed to determine the surface wave properties.

Figure 1:
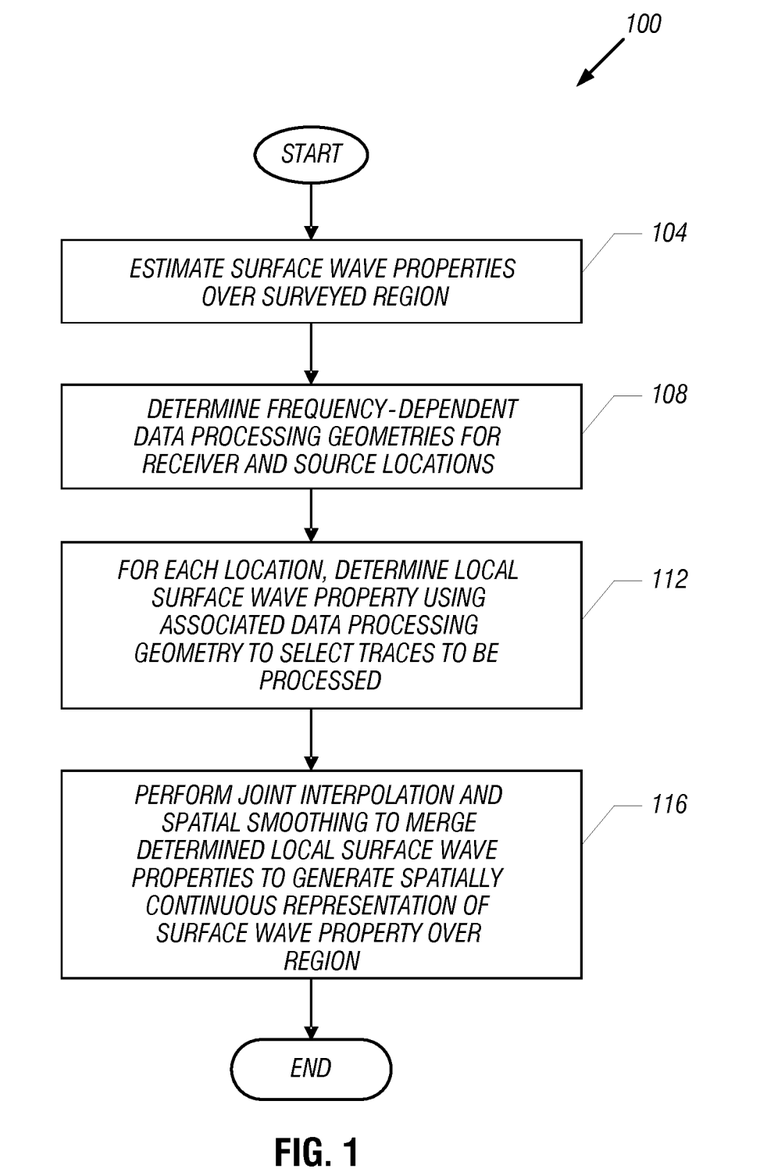
FIGS. 1 and 3 are flow diagrams depicting techniques to determine a spatially continuous three-dimensional representation of a surface wave property over a survey region according to embodiments of the invention.

Referring to FIG. 1, in accordance with a more specific example, a technique 100 may be used to process seismic data acquired by a seismic acquisition array that has an arbitrary geometry to generate a spatially continuous 3-D representation of a given surface wave property. The technique 100 includes first processing the seismic data to estimate surface wave properties over the surveyed region, as set forth in block 104. This step may includes identifying average surface wave properties, including identifying the wave type (i.e., Rayleigh waves, Love waves, Scholte waves, P-guided waves, etc.), identifying the wave modes and identifying the frequency and velocity ranges of the surface wave. It is noted that the surface wave may be a composite wave that is formed from more than one type of fundamental surface wave.

Next, the technique 100 includes determining (block 108) a frequency-dependent data processing geometry for each location (each receiver location, for example) of the surveyed region. The data processing geometry defines a sub-array of the overall survey acquisition array. The traces from the sub-array are processed to determine the surface wave property for the associated location. The data processing geometry may be defined by, for example, an azimuthal range and an offset range; as further described below, these ranges vary with frequency. As also described further below, for each location, the offset range, azimuthal range, the maximum wavenumber and the frequencies are selected, based on such factors as the spatial sampling of the source-receiver offset, the amplitude spectrum of the seismic data, lateral variations in the surface wave property near the location, the desired spatial resolution, the desired signal-to-noise ratio (SNR), the size of the geometry and the degree of overlap between adjacent geometries.

If the surface wave property is locally homogenous in an area that contains a given sub-array, then the local surface wave properties may be expressed as a function of the source to detector offset. The area influencing the wave propagation is limited to a small neighborhood of the location. As further described below, the data selection is adaptive such that for each location, different traces are selected for each frequency or frequency band to minimize near field effects and exclude far offsets.

Figure 2:
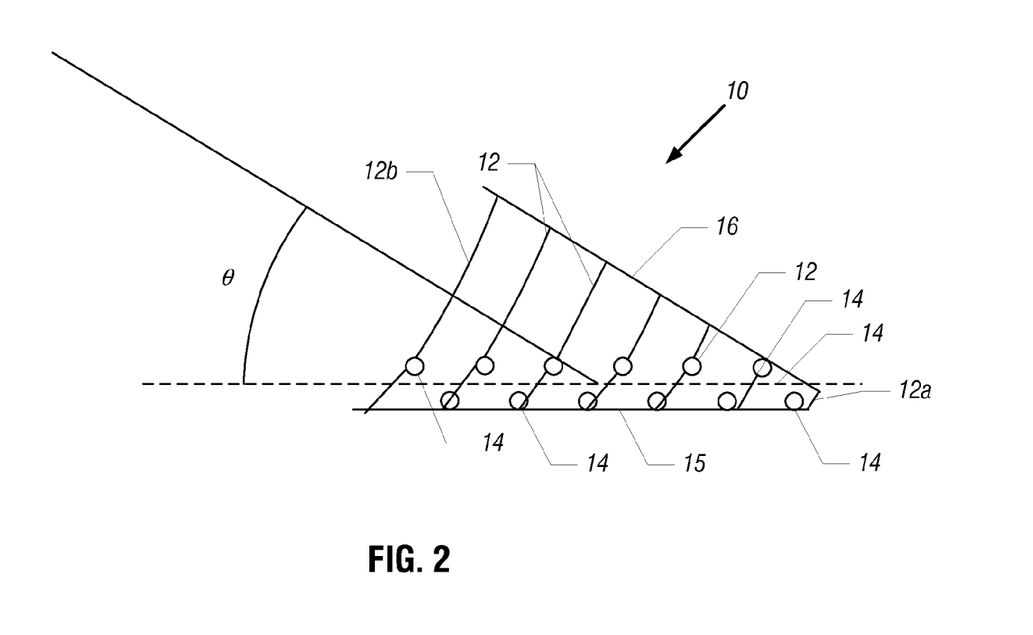
FIG. 2 is a schematic diagram illustrating an exemplary local data processing geometry for a given frequency according to an embodiment of the invention.

As a more specific example, FIG. 2 depicts an exemplary data processing geometry 10 for a given location for a given frequency. Boundaries of the data processing geometry 10 are defined by an azimuth θ, which delineates the wavefronts that are analyzed for the location. An offset range is also selected as a parameter of the data processing geometry 10. The offset selection includes a frequency dependant minimum and maximum offset, to take into account the near field and the attenuation. In this regard, exemplary offsets 12 and are depicted in FIG. 2. For example, the data processing geometry 10 for the location may be constrained between offsets 12a to 12b and between azimuthal lines 15 and 16. Other azimuths θ and offsets 12 may be used for other data processing geometries, as the data processing geometry is designed for each specific receiver/source location, in accordance with some embodiments of the invention.

Still referring to the technique 100 in FIG. 1, the technique 100 further includes determining (block 112) a local estimate of the propagation parameters at each location given the associated data processing geometry. More specifically, for each group of receivers/sources associated with the data processing geometry, the shot gathers that conform to the associated data processing geometry are selected. For each shot or receiver gather, a wavefield transform is applied to map data from the time-source offset (t-x) domain into the frequency-wavenumber (f-k) domain. A high resolution transform may then be applied without the need of a regular spacing in the original domain. The properties of the estimated spectra can vary with the frequency, including the maximum wavenumber and the spectral resolution. The spectra are stacked, and the propagation parameters are then extracted. The same approach may be applied to common receiver gathers. For attenuation properties, a local regression of the spectral amplitude may then be performed. The adaptive nature of the workflow allows the optimal selection of data also for the estimation of the attenuation.

The technique 100 further includes, pursuant to block 116, performing joint interpolation and spatially smoothing the determined local properties for purposes of deriving the continuous 3-D spatial representation of the surface wave properties. This operation considers the mutual correlation of the local properties and their spatial correlation due to the scale of the site lateral variations and also considers the overlap between adjacent data processing geometries 10.

It is noted that blocks 108, 112 and 116 may be repeated for each wave mode and wave type.

Depending on the particular embodiment of the invention, several different types of propagation parameters may be extracted from the surface wave data. For the examples described herein, dispersion curves (called "V(f)") and attenuation curves (called "D(f)") are the propagation parameters that are considered.

Because the surface wave is dispersive, a single propagation velocity cannot be used to describe the wave speed. For each individual mode, a phase velocity and group velocity therefore exists; and the complete description of the wave speed requires specifying the dispersion curve (phase or group) in the entire frequency band. The phase and group velocities are related, and as such, one may be determined from the other.

The dispersion curves V(f) may be used to filter data with different approaches, such as frequency-wavenumber (f-k) filtering, phase matching, etc., and may also be used to estimate the near-surface velocity profile at the considered location.

In accordance with some embodiments of the invention, the velocity (called "V") may be expressed as follows:

$$V = v_{ph}(f),  \quad\text{Eq. 1}$$

where "$v_{ph}(f)$" represents the phase velocity.

Similarly, the intrinsic attenuation D(f) depends on the wavenumber, and the attenuation coefficient is frequency dependent. The intrinsic attenuation term, for every single mode, may be written as follows:

$$e^{-\alpha(f)X} = e^{-K(f)D(f)X},  \quad\text{Eq. 2}$$

where "$e^{-\alpha(f)X}$" represents the attenuation coefficient.

A damping ratio curve (called "D(f)") may be regarded as a local propagation parameter. The D(f) damping ratio (and the quality factor $Q=0.5\,D^{-1}$) is frequency dependent because of the different penetration of the different frequencies.

Regarding the design of the data processing geometries, the size of each individual group of receivers used for a particular data processing geometry is designed to extract the propagation parameters for the determined lateral variations and the desired lateral resolutions. A minimum size and number of receivers may be designed and used as a selection criterion, in accordance with some embodiments of the invention. For example, in a 3-D geometry, for a receiver line, exact groups of receivers may be extracted with a maximum size in the in-line and cross-line directions.

Figure 3:
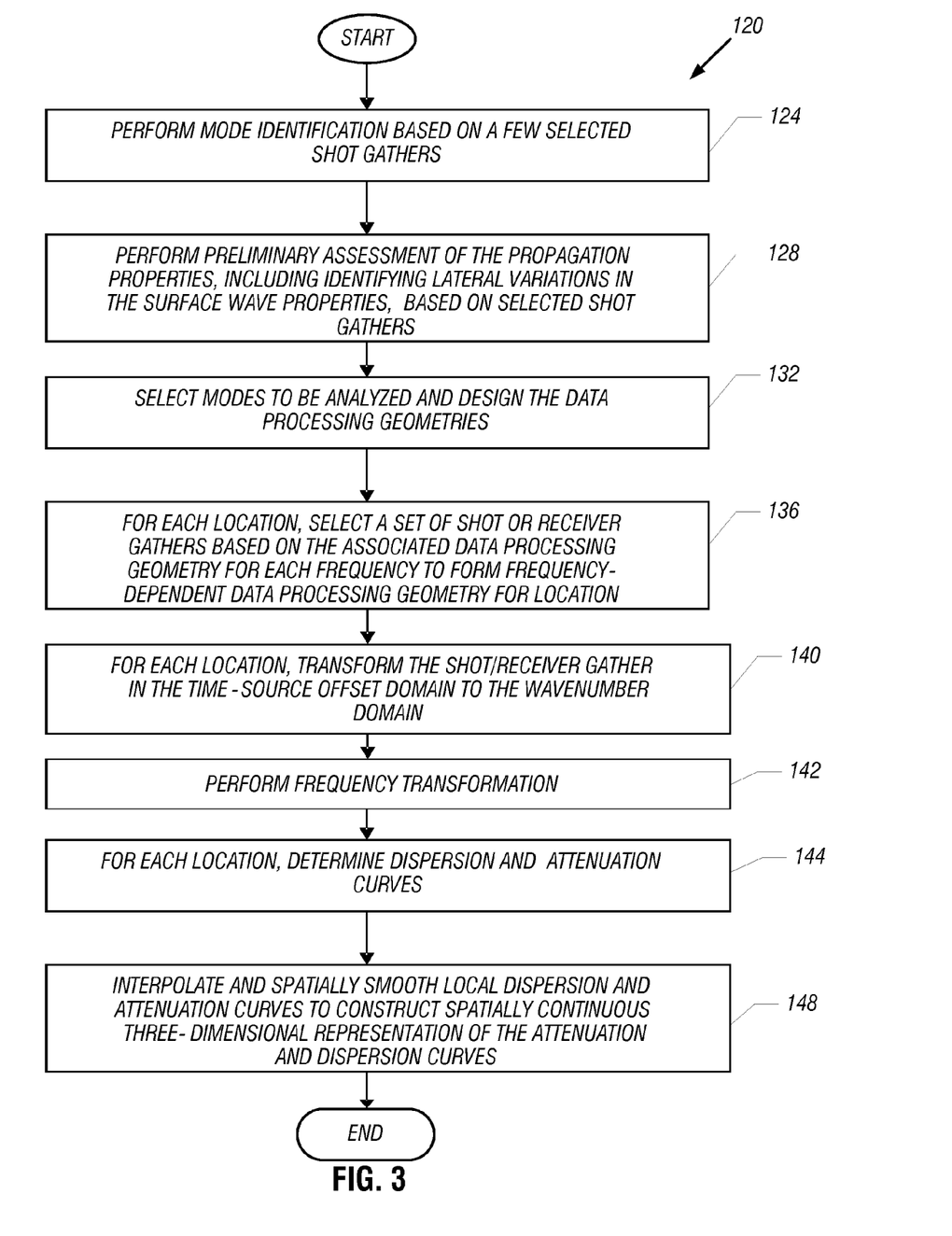

As a more specific example, FIG. 3 depicts a flow diagram 120 illustrating a technique to derive the spatially continuous 3-D representation of a surface wave property, according to an embodiment of the invention. Pursuant to the technique 120, mode identification is performed (block 124) in a few selected shot gathers. In this regard, selected shot gathers that span a relatively large offset range may be selected in order to analyze and classify the near surface modes. More specifically, the selected shot gathers are analyzed to detect the presence of multiple modes, their phase velocity and attenuation. Shot gathers may be analyzed using wavefield transforms such as the frequency-wavenumber (f-k) transform, followed by the tracking of energy maxima. As a non-limiting example, the Rayleigh wave dispersion curve may be inverted to obtain a preliminary near surface model as an input for the simulation of the complete near surface wavefield. Modeled modes may be compared with the measured modes to identify events.

After the mode identification, the technique 120 includes performing (block 128) a preliminary assessment of the propagation properties and identifying the lateral variation in the few selected shot gathers In this regard, for each the different modes and/or wave types, frequency and velocity ranges are identified. The phase and group velocities are determined, and the attenuation is estimated. The offset range within which the event to be analyzed is present at a sufficiently large SNR is then estimated. Lateral variations within the selected gathers may be analyzed using, as non-limiting examples, phase analysis or short-space f-k transforms. The preliminary assessment of the scale of lateral variations is carried out, and the result is compared to other information, such as non-seismic methods and remote sensing data.

The technique 120 includes selecting (block 132) the modes and/or wave types to be analyzed and for each mode/ wave type to be analyzed, determining the data processing geometry for each location, pursuant to block 132. The geometry is a compromise between obtaining increased spectral resolution and the spatial resolution that is required by lateral variations.

Figure 5A:
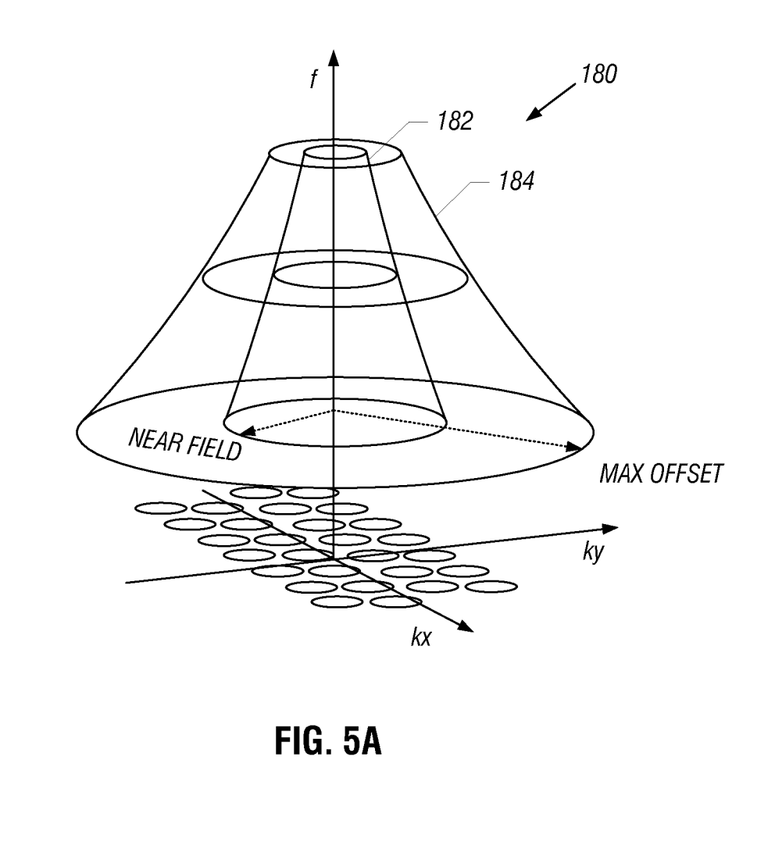
FIGS. 5A and 5B are schematic diagrams depicting exemplary adaptive offset selection and transforms according based on frequency-dependent wave propagation properties according to an embodiment of the invention.
Figure 5B:
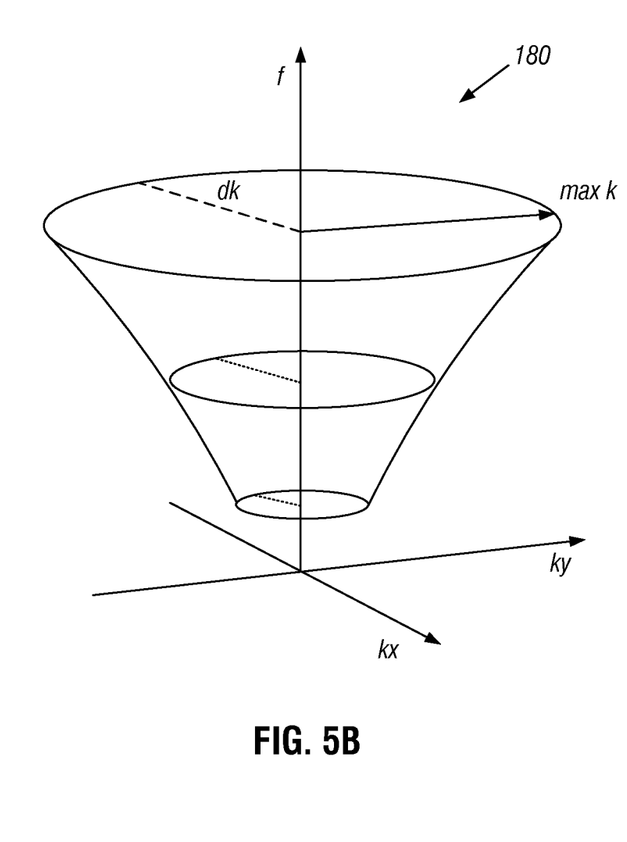

As an example, referring to FIG. 5A in conjunction with FIG. 3, the selected offsets at a particular location vary spatially and with frequency, as depicted in an exemplary data processing geometry 180. FIG. 5B depicts the corresponding data processing geometry 180 in frequency-wavenumber (f-k) space. As can be seen in FIGS. 5A and 5B, the adaptive selection and computation allows a higher lateral resolution in the high frequency range where shorter wavelengths (larger wavenumbers) are recorded and a higher accuracy at lower frequencies where longer wavelengths (smaller wavenumbers) are recorded. More specifically the near field effects decrease with frequency, thereby leading to the exclusion of the smaller offsets at lower frequencies, as depicted in FIG. 5A. Due to greater signal degradation at larger frequencies, far offsets are excluded more at the higher frequencies, as also depicted in FIG. 5A. The size of the array of the geometry, the overlap between adjacent acquisition geometries and the minimum and maximum source offset may be specifically considered in designing the data processing geometry, in accordance with some embodiments of the invention. Furthermore, considering the geometry of data to be processed, the minimum and maximum azimuths are also determined. Widening the azimuth range increases the number of shots or receivers that are considered for each location, thereby increasing the robustness of the estimate. The presence of azimuthal anisotropy can be assessed considering the full azimuth range and comparing results for different azimuths bins. However, at the same time, the computation time and the impact of anomalies, which are not located exactly below the receivers of the data processing geometry increase.

Thus, for each location, a set of shot gathers or receiver gathers are selected, pursuant to block 136; and for a given location, the data fulfilling the different criteria according to the data processing geometry are selected. For example, in a cross-spread 3-D geometry, for each location along a receiver line or along a macro-line made of multiple sub-lines, the traces that are considered are all shot points within the designed offset and azimuth ranges. Similarly, for selection of common receiver gathers with a source array along a source line, the offset and azimuth ranges are used. For a macro-line made of several sub-lines, a group of detectors is extracted around a given location, and a set of sources from a range of offsets and azimuths are selected, as depicted in FIG. 4.

Figure 4:
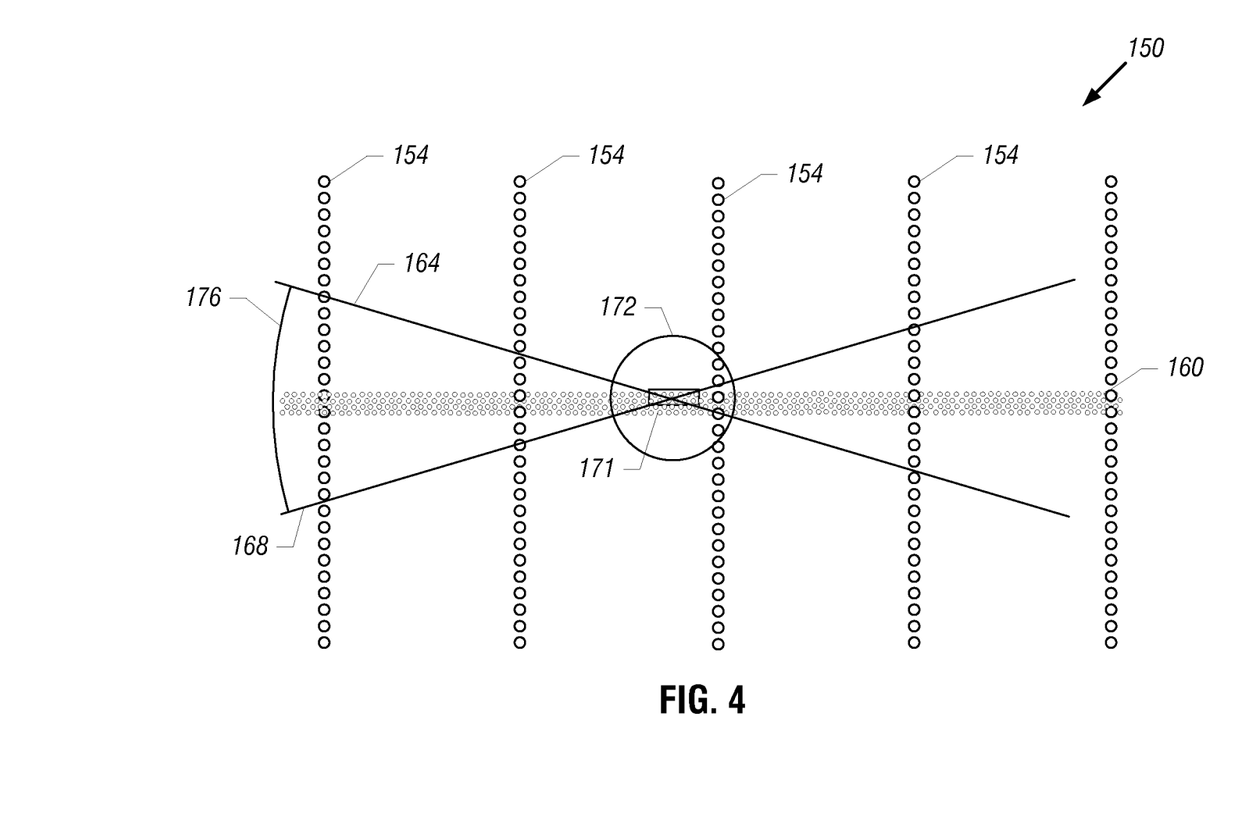
FIG. 4 is a schematic diagram of a seismic survey array illustrating offset and azimuth constraints for an exemplary local data processing geometry according to an embodiment of the invention.

In this regard, also referring to FIG. 4, the seismic survey array 150 includes receiver sub-lines 160 and source lines 154. The source and receiver locations for a given location 171 are constrained by requiring the offsets to be constrained between a radius 172 and a radius 176, and the locations are also constrained by an azimuthal range, defined between lines 164 and 168. The azimuthal anisotropy can be assessed evaluating the properties across different azimuth bins.

Therefore, the net result of block 136 is the derivation of a frequency dependent data processing geometry for each location.

Still referring to FIG. 3, next, for each location, each shot/ receiver gather is transformed in the time-source offset domain to produce a high resolution wavefield transform, pursuant to block 140. The transform data are stacked, and maximum tracking is used to derive the dispersion curves.

As a more specific example, in accordance with some embodiments of the invention, for each location, an unevenly spaced high-resolution wavefield transform is determined, such as the Multiple Signal Classification (MUSIC) algorithm that is set forth in Schmidt, R. O., *Multiple Emitter Location and Signal Parameter Estimation*, IEEE TRANSACTIONS ON ANTENNAS PROPAGATION, Vol. AP-34, 276-280 (1986). The transform is applied to different datasets, consisting of traces fulfilling different criteria of minimum and maximum offset, for each frequency or frequency band. The output parameters are designed according to the expected maximum wavenumber and required spectral resolution (wavenumber discretization) and are frequency dependent.

The wavefield transform transforms the acquired data from the space to the wavenumber domain, and a standard Fast Fourier Transform (FFT) may be used to transform the data from the time domain into the frequency domain, as depicted in block 142. Muting may be applied on gathers before the transformation to remove energy from outside the surface wave signal cone. A stacked spectrum may then be computed by averaging all individual contributions, and a weighted summation may then be performed, considering the quality of the data. The maxima are tracked in the stacked spectrum, such as by using the same picking algorithm in the individual spectra to estimate uncertainties via statistical analysis of the picks distribution.

Next, pursuant to the technique 120, for each location, the dispersion and attenuation curves are determined, pursuant to block 144. In this manner, for each location and for each gather, the spectral amplitudes are determined. At each frequency, a regression may be performed to compute the attenuation coefficient. The attenuation for an individual mode, may be expressed as follows:

$$A(x, f) = A_0(f) \cdot \frac{1}{\sqrt{r}} \cdot e^{-D(f) \cdot X \cdot K(f)}, \qquad \text{Eq. 3}$$

where "A(x, f)" represents the attenuation, "$A_0(f)$" represents the attenuation for zero offset. Equation 3 may be rewritten as follows:

$$\log(\sqrt{\sqrt{r}} \cdot A(x, f)) = \log(A_0(f)) - D(f) \cdot K(f) \cdot X. \qquad \text{Eq. 4}$$

The logarithm of the amplitude, corrected with the square root of the offset, is a linear function of the offset. The slope α(f) may be determined as follows:

$$\alpha(f) = D(f) \cdot K(f). \qquad \text{Eq. 5}$$

The attenuation curve A(f) is determined and then merged with the dispersion curve to determine the damping ratio D(f). The attenuation coefficients and residuals of the amplitude are stored to determine the average attenuation curve, and the statistics of the residuals indicate the perturbations.

Finally, pursuant to the technique 120, the dispersion curves and attenuation curves are interpolated to build the pseudo sections, and the pseudo sections are integrated to form the spatially continuous 3-D representation of the surface wave properties, pursuant to block 148. In this regard, at each considered location, a set of dispersion and attenuation curves are determined, and the determined curves are associated to the center of the data processing geometry. The results obtained for the different locations are then merged to obtain a continuous smooth spatial representation of the surface wave properties. Due to the spatial structure and correlation and due to the overlap between adjacent geometries used in the computation, the obtained image has a lateral smoothness, function of the frequency, and this property is used to eliminate outliers and noisy portions. The overlap is frequency dependent, as a result of the adaptive workflow, and mirrors the physical lateral resolution of the different wavelengths. The mutual correlation between velocity and attenuation may be used to improve the regularity. The lateral smoothness constraints are relaxed at locations where sharp lateral variations are expected to appear.

Figure 6:
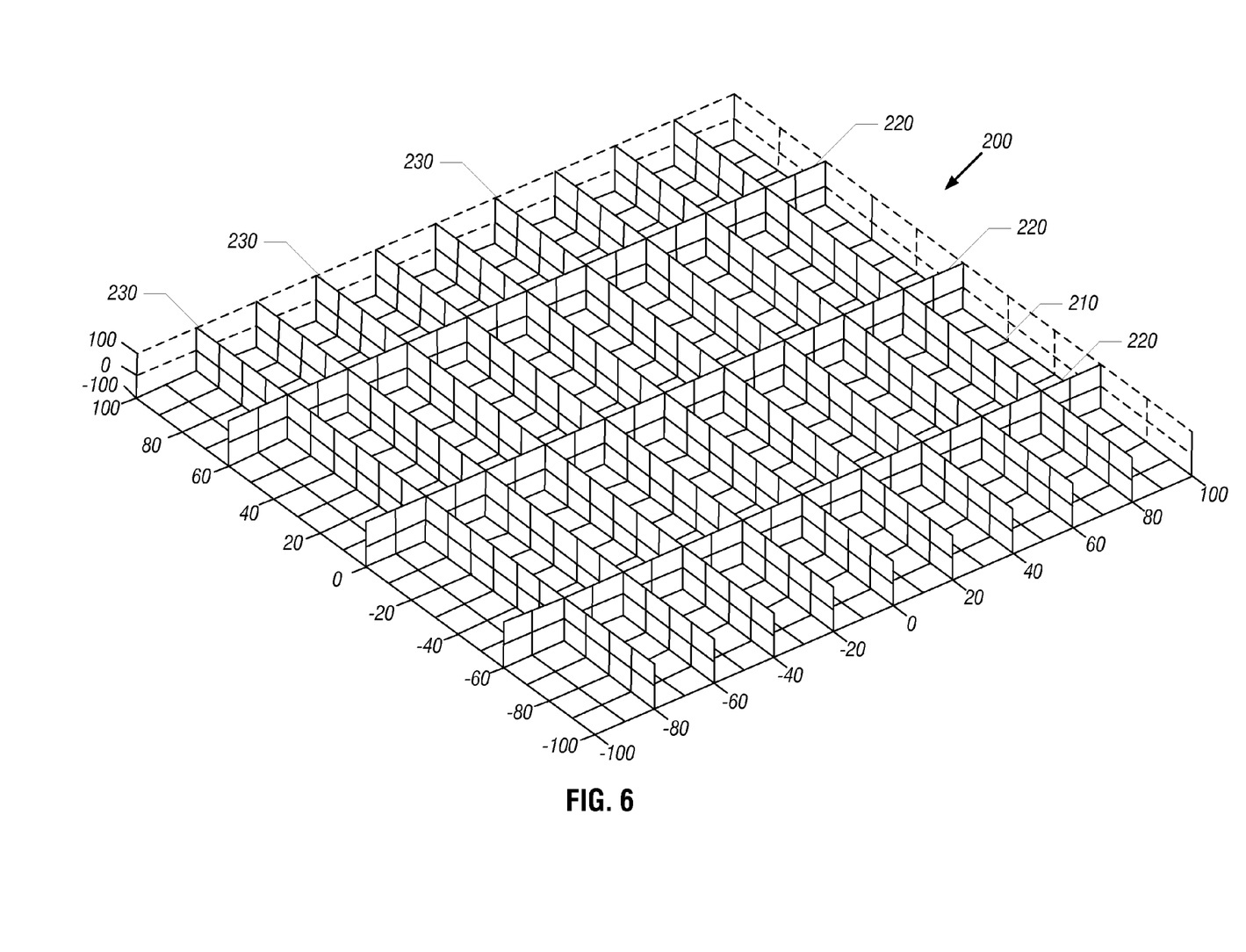
FIG. 6 is a schematic diagram of a three-dimensional swath seismic acquisition geometry according to an embodiment of the invention.

Referring to FIG. 6, as an example, in a swath acquisition array 200, a set of perpendicular source 220 and receiver 230 lines are used to form corresponding sets of pseudo-sections. As depicted in FIG. 6, the source 220 and receiver 230 lines may be arranged in a grid 210 as shown in FIG. 6.

Among the advantages that may be achieved using the system and techniques that are described herein, a spatial distribution of the surface wave properties may be obtained using any geometry. The techniques and systems permit the processing of pseudo sections of the surface wave properties below each receiver line and each source line with normal 3-D geometries. The obtained properties may be used for such purposes as near surface modeling, static corrections, the calibration of local filters for filtering out coherent noise and for purposes of producing synthetic noise for filtering procedures.

Figure 7:
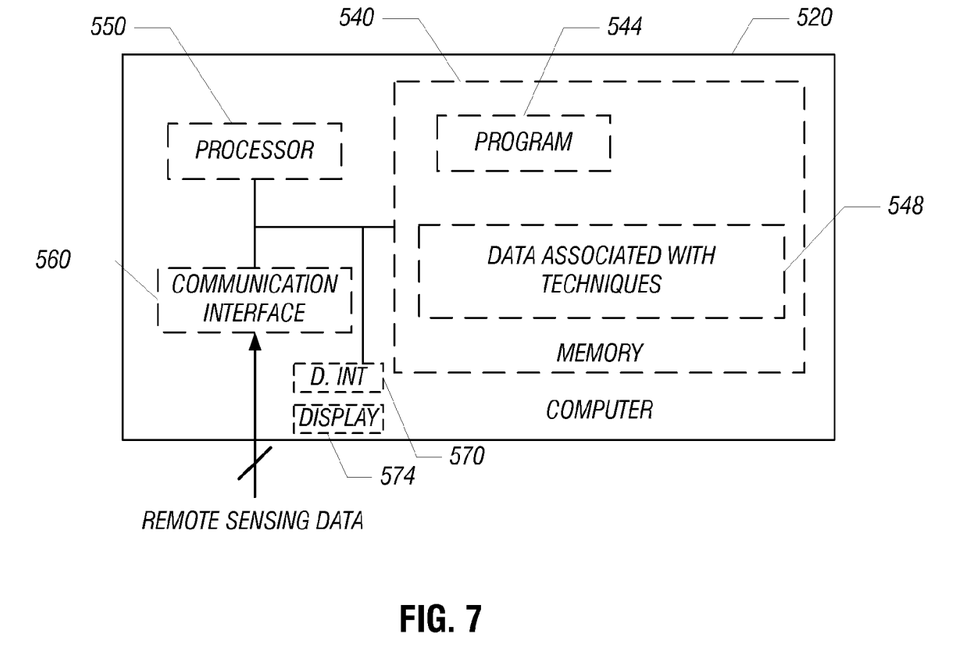
FIG. 7 is a schematic diagram of a data processing system according to an embodiment of the invention.

Referring to FIG. 7, in accordance with some embodiments of the invention, a data processing system 520 may include a processor 550 that is constructed to execute at least one program 544 (stored in a memory 540) for purposes of processing seismic data to perform one or more of the techniques that are disclosed herein. The processor 550 may be coupled to a communication interface 560 for purposes of receiving seismic data acquired in a seismic survey. In addition to storing instructions for the program 554, the memory 540 may store preliminary, intermediate and final datasets involved in the techniques that are disclosed herein. Among its other features, the data processing system 520 may include a display interface 570 and display 574 for purposes of displaying the various curves and models that are generated as described herein.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   receiving seismic data acquired by receivers in a survey of a region, the region being associated with locations;
   processing the seismic data to estimate at least one frequency dependent surface wave property over the region;
   locally determining frequency dependent data processing geometries across the region, comprising determining a frequency dependent data processing geometry for each location based at least in part on said at least one estimated frequency dependent surface wave property evaluated at said each location, the frequency dependent data processing geometry identifying a geometry-based selection of the receivers; and
   processing the seismic data in a processor-based machine based at least in part on the determined data processing geometries to derive a spatially continuous representation of a surface wave property across the region.

2. The method of claim 1, further comprising:
   processing the seismic data to identify surface wave modes; and
   performing the acts of processing the seismic data to estimate said at least one frequency-dependent surface wave property, determining the frequency-dependent data processing geometry for each location and processing the seismic data based on the determined data processing geometries for each identified mode.

3. The method of claim 1, further comprising:
   processing the seismic data to determine a frequency dependent offset range associated with a sufficient signal-to-noise ratio and without near field-effects; and
   further basing the act of determining the frequency-dependent data processing geometry for each location on the determined offset range.

4. The method of claim 1, wherein the act of processing the seismic data based at least in part on the determined data processing geometries comprises:
   processing the seismic data to determine at least one of a phase velocity, a group velocity and an attenuation; and
   optimizing the processing based at least in part on a frequency dependence of a wavenumber.

5. The method of claim 1, wherein the act of processing the seismic data based at least in part on the determined data processing geometries comprises:
   for each location, selecting gathers based on the associated data processing geometry and processing the selected gathers.

6. The method of claim 1, wherein the act of processing the seismic data based at least in part on the determined data processing geometries comprises:
   for each location, determining a spatially continuous representation of the surface wave property in a subregion associated with the location; and
   merging the spatially continuous representations of the surface wave property in the subregion to generate the spatially continuous representation of the surface wave property across the region.

7. A system comprising:
   an interface to receive seismic data acquired by receivers in a survey of a region, the region being associated with locations; and
   a processor to:
   process the seismic data to estimate at least one frequency-dependent surface wave property over the region;

locally determine frequency dependent data processing geometries across the region by determining a frequency-dependent data processing geometry for each location based at least in part on said at least one estimated frequency dependent surface wave property evaluated at said each location, the frequency dependent data processing geometry identifying a geometry-based selection of the receivers; and process the seismic data based at least in part on the determined data processing geometries to derive a spatially continuous representation of the surface wave property across the region.

8. The system of claim 7, wherein the processor is adapted to:

process the seismic data to identify surface wave modes; and estimate said at least one frequency-dependent surface wave property based on the identified modes.

9. The system of claim 7, wherein the processor is adapted to:

further base the act of determining the frequency-dependent data processing geometry for each location on a size of a receiver array associated with the data processing geometry.

10. The system of claim 7, wherein the processor is adapted to:

determine an offset range for the geometry.

11. The system 7, wherein the processor is adapted to:

for each location, select gathers based on the associated frequency-dependent data processing geometry and process the selected gathers.

12. The system of claim 7, wherein the processor is adapted to:

for each location, determine a spatially continuous representation of the surface wave property in a subregion associated with the location; and merge the spatially continuous representations of the surface wave property in the subregion to generate the spatially continuous representation of the surface wave property across the region.

13. An article comprising a computer readable storage medium storing instructions that when executed by a computer cause the computer to:

receive seismic data acquired by receivers in a survey of a region, the region being associated with locations;

process the seismic data to estimate at least one frequency-dependent surface wave property over the region;

locally determine frequency dependent data processing geometries across the region by determining a frequency-dependent data processing geometry for each location based at least in part on said at least one estimated frequency dependent surface wave property evaluated at said each location, the frequency dependent data processing geometry identifying a geometry-based selection of the receivers; and process the seismic data based at least in part on the determined data processing geometries to derive a spatially continuous representation of the surface wave property across the region.

* * * * *